US009710590B2

(12) United States Patent
Probell et al.

(10) Patent No.: US 9,710,590 B2
(45) Date of Patent: Jul. 18, 2017

(54) ESTIMATION OF CHIP FLOORPLAN ACTIVITY DISTRIBUTION

(71) Applicant: Arteris, Inc., Campbell, CA (US)

(72) Inventors: Jonah Probell, Alviso, CA (US); Monica Tang, San Jose, CA (US)

(73) Assignee: ARTERIS, Inc., Campbell, CA (US)

( * ) Notice: Subject to any disclaimer, the term of this patent is extended or adjusted under 35 U.S.C. 154(b) by 0 days.

(21) Appl. No.: 14/588,301

(22) Filed: Dec. 31, 2014

(65) Prior Publication Data

US 2016/0188779 A1    Jun. 30, 2016

(51) Int. Cl.
 *G06F 17/50*    (2006.01)
(52) U.S. Cl.
 CPC ...... *G06F 17/5081* (2013.01); *G06F 17/5072* (2013.01); *G06F 17/5022* (2013.01); *G06F 17/5045* (2013.01); *G06F 17/5068* (2013.01); *G06F 2217/10* (2013.01)
(58) Field of Classification Search
 CPC ............ G06F 17/5022; G06F 2217/10; G06F 17/5045; G06F 17/5068
 See application file for complete search history.

(56) References Cited

U.S. PATENT DOCUMENTS

| | | | | |
|---|---|---|---|---|
| 5,541,849 A | * | 7/1996 | Rostoker | G01R 31/31704 714/E11.167 |
| 5,553,002 A | * | 9/1996 | Dangelo | G01R 31/31704 714/E11.167 |
| 5,598,344 A | * | 1/1997 | Dangelo | G01R 31/31704 714/E11.167 |
| 5,668,732 A | * | 9/1997 | Khouja | G06F 17/5022 702/181 |
| 5,751,592 A | * | 5/1998 | Takai | G06F 17/5045 716/106 |
| 5,805,861 A | * | 9/1998 | Gilbert | G06F 17/5045 703/15 |
| 5,872,952 A | | 2/1999 | Tuan et al. | |
| 6,195,593 B1 | * | 2/2001 | Nguyen | G06F 17/5045 700/121 |
| 6,209,119 B1 | * | 3/2001 | Fukui | G06F 17/5045 716/104 |
| 6,363,515 B1 | | 3/2002 | Rajgopal et al. | |
| 6,567,963 B1 | * | 5/2003 | Trezza | G02B 6/43 716/118 |
| 6,598,209 B1 | * | 7/2003 | Sokolov | G06F 17/5022 716/104 |
| 6,654,946 B1 | * | 11/2003 | Eneboe | G06F 17/5045 716/104 |
| 6,665,843 B2 | * | 12/2003 | Klink | G06F 17/5036 327/540 |

(Continued)

*Primary Examiner* — Helen Rossoshek

(57) ABSTRACT

Simulation or calculation to estimate activity per unit in a chip design, combined with estimation of the specific location or region in which the unit logic will be finally placed, provides for calculation of an estimation of the activity distribution within the floorplan. Activity distribution estimation can be performed with fine granularity (at a gate level), at coarse granularity (at a macro level), or at an intermediate granularity (at a network-on-chip unit level). The estimation is displayed, visually, to a user of a design tool. Furthermore, the estimation is used to make manual or automatic optimizations of the floorplan and the location and configuration of units within the floorplan.

9 Claims, 3 Drawing Sheets

(56) References Cited

U.S. PATENT DOCUMENTS

| | | | |
|---|---|---|---|
| 6,925,616 B2* | 8/2005 | Noujeim | G01R 31/31721 324/512 |
| 7,260,809 B2 | 8/2007 | Ravi et al. | |
| 7,325,215 B2* | 1/2008 | Dinter | G06F 17/5031 716/114 |
| 7,444,610 B1* | 10/2008 | Carreira | G06F 17/5054 703/20 |
| 7,480,606 B2* | 1/2009 | Tseng | G06F 17/5022 361/788 |
| 7,600,208 B1* | 10/2009 | Sharma | G06F 17/5068 716/120 |
| 7,610,569 B2* | 10/2009 | Park | G06F 11/2733 703/20 |
| 7,784,008 B1 | 8/2010 | Hutton et al. | |
| 7,823,102 B2* | 10/2010 | Chandra | G06F 17/5009 716/106 |
| 7,877,715 B1 | 1/2011 | Thirunavukarasu et al. | |
| 7,899,659 B2* | 3/2011 | Tester | G06F 17/5022 345/440.1 |
| 7,913,217 B1* | 3/2011 | Carreira | G06F 17/5054 703/14 |
| 8,042,087 B2* | 10/2011 | Murali | G06F 17/5045 370/235 |
| 8,196,085 B1* | 6/2012 | Milton | G06F 17/505 716/102 |
| 8,286,112 B2* | 10/2012 | Miranda | G06F 17/5031 716/110 |
| 8,561,005 B2* | 10/2013 | Durbha | G06F 17/5045 716/109 |
| 8,739,094 B2* | 5/2014 | Fennell | G06F 17/5027 716/100 |
| 8,762,916 B1* | 6/2014 | Kathail | G06F 17/5045 326/37 |
| 9,087,164 B2* | 7/2015 | Perry | G06F 17/50 |
| 2003/0208733 A1* | 11/2003 | Sokolov | G06F 17/5022 716/109 |
| 2005/0060679 A1* | 3/2005 | Papanikolaou | G06F 17/5045 716/120 |
| 2006/0117274 A1* | 6/2006 | Tseng | G06F 17/5022 716/106 |
| 2009/0031268 A1* | 1/2009 | Miranda | G06F 17/5031 716/113 |
| 2009/0185408 A1* | 7/2009 | Takenaka | G06F 13/4077 365/63 |
| 2010/0017173 A1* | 1/2010 | Fabin | G06F 17/5036 703/2 |
| 2010/0169853 A1* | 7/2010 | Jain | G06F 17/5022 716/104 |
| 2010/0180245 A1* | 7/2010 | Rutten | G06F 11/323 716/113 |
| 2011/0029299 A1* | 2/2011 | Zhu | G06F 17/5022 703/14 |
| 2012/0023471 A1* | 1/2012 | Fischer | G06F 17/5068 716/115 |
| 2013/0174113 A1* | 7/2013 | Lecler | G06F 17/5072 716/122 |
| 2013/0179855 A1* | 7/2013 | Elliott | G06F 17/5009 716/139 |
| 2013/0262733 A1* | 10/2013 | Boucard | G06F 13/4059 710/309 |
| 2013/0339917 A1* | 12/2013 | Darringer | G06F 17/5081 716/120 |
| 2014/0137057 A1* | 5/2014 | Tzoref-Brill | G06F 11/3676 716/107 |
| 2014/0143531 A1* | 5/2014 | Lecler | G06F 17/505 713/100 |
| 2015/0213169 A1* | 7/2015 | Meyer | G06F 17/5022 716/107 |
| 2015/0341224 A1* | 11/2015 | van Ruymbeke | H04L 41/12 370/254 |
| 2015/0364212 A1* | 12/2015 | Razzaz | G11C 29/023 365/193 |
| 2016/0070842 A1* | 3/2016 | Barowski | G06F 17/5077 716/130 |

\* cited by examiner ically, electronic design automation.

ESTIMATION OF CHIP FLOORPLAN ACTIVITY DISTRIBUTION

FIELD OF THE INVENTION

The invention is in the field of chip design and, more specifically, electronic design automation.

BACKGROUND

An increasingly significant consideration in chip design is power consumption. This includes not just the overall power consumption, but the distribution of localized power consumption and not just the time-averaged but the maximum instantaneous power consumption.

The placement of logical units within the floorplan of a chip significantly determines power consumption. The terms "logical unit," "logic," and "unit" as used herein each have their industry standard meaning and may further refer to one or more: circuits, components, registers, processors, software, or any combination thereof. In particular, power consumption is determined by the amount of activity within logical units. The amount of activity in logical units can be estimated by simulations.

What is needed is a system and method with an effective way to associate simulation information to distributed, localized power consumption within the floorplan of a chip, visualize the power consumption, and use the associated information to improve the distribution.

SUMMARY OF THE INVENTION

One aspect of the invention is directed to estimating localized activity within a chip floorplan. This is done by calculating, for a range of locations in the floorplan, the activity distribution as a function of the location of a number of units and the amount of activity of each of those units.

Another aspect of the invention is directed to visualizing the result by displaying the floorplan, overlaid with activity information. The activity information can be shown for units based on internal activity or for connections between units based on data transfer activity.

The calculation of activity distribution can be based on a unit location estimation function. The activity distribution can also be based on either a simulation or a calculated amount of activity per unit.

Another aspect of the invention is directed to optimizing the chip design based on the activity distribution information. This can be done by calculation or by an iterative process. Furthermore, optimizations can be optimization of the floorplan or optimization of the units to be placed within the floorplan.

The above aspects of estimation, visualization, and optimization can be implemented in software, executed on one or more computing devices from one or more non-transient computer readable media.

DETAILED DESCRIPTION

Figure 1:
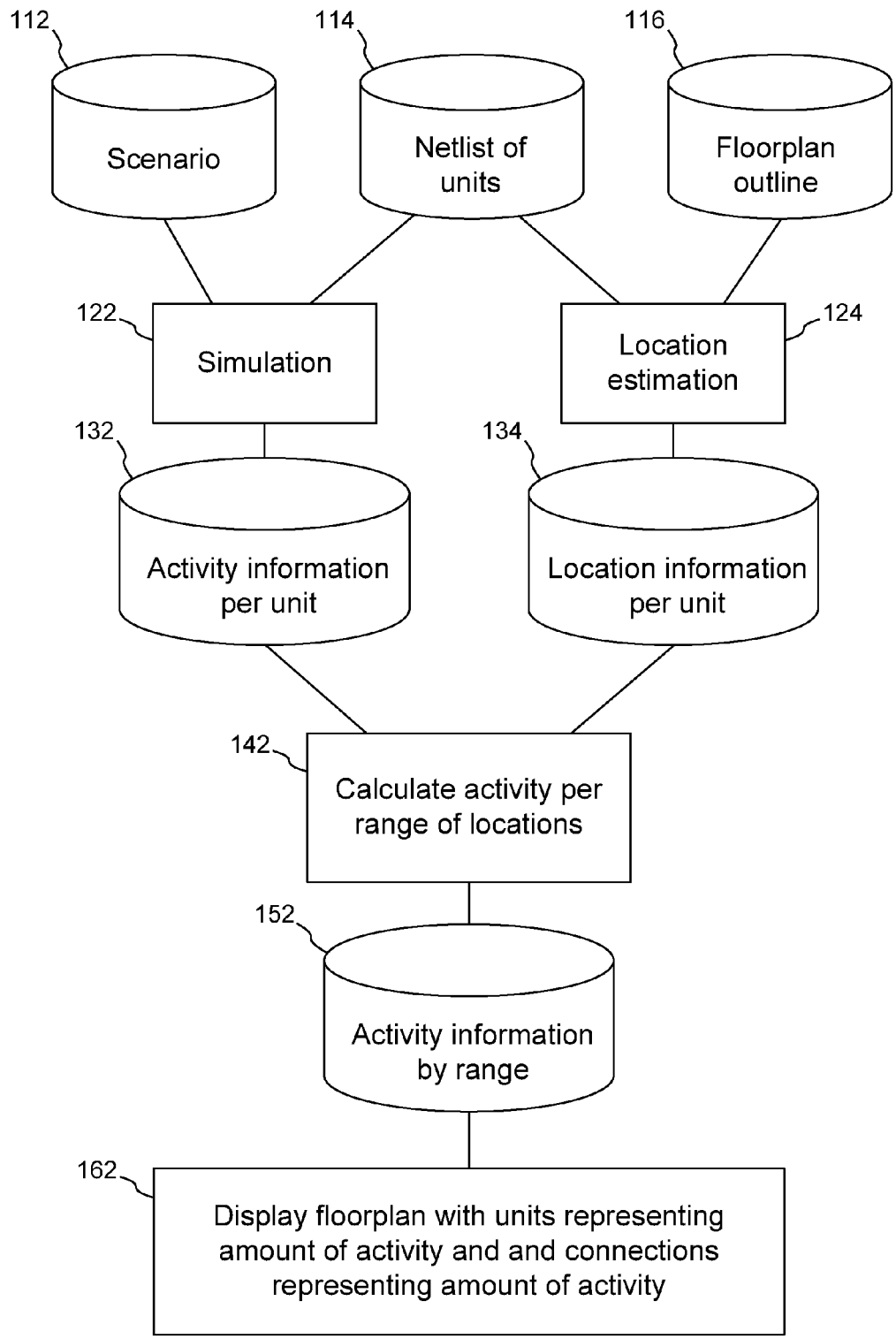
FIG. 1 is a flowchart of a method of estimating and displaying activity distribution within a floorplan in accordance with the various aspects of the invention.

Before describing in detail the embodiments that are in accordance with invention, it should be observed that the embodiments reside primarily in combinations of method step and apparatus components related to facilitating the invention. Accordingly the components and method steps have been represented where appropriate by conventional symbols in the drawing showing only those specific details that are pertinent to understanding the embodiments of the present invention so as not to obscure the disclosure with details that will be readily apparent to those of ordinary skill in the art having het benefit of the description herein.

The invention provides for estimation and visualization of the distribution of power consumption within a chip floorplan at an early stage in the chip design process, and usage of that information for optimization of the placement of logical units.

Estimation

According to the various aspects as capture in an embodiment of the invention, a SAIF file is generated by a gate level or RTL simulation, such as a Verilog simulation. The SAIF file indicates switching activity per library cell unit. A post-placement layout view of the chip is shown with the per-gate activity overlaid.

According to other aspects and another embodiment of the invention, an activity file, such as a value change dump (VCD) file, is generated by an electronic system level (ESL) simulation, such as a SystemC simulation. The activity file indicates channel transfer activity per module interface. A post-placement layout view of the chip is shown with per-module unit activity overlaid. The location of logical units is determined based on module-indicative register and I/O names preserved through synthesis and placement.

The network-on-chip (NoC) includes logic spread throughout the chip as well as the longest wires. Significant power is consumed in the logic and wires of NoCs. Power consumption is proportional to the amount of activity in each part of the NoC. Arrangement of the chip floorplan and the NoC within the floorplan affect where, physically in the chip, that NoC power is consumed.

According to various aspects and another embodiment of the invention, activity data is generated by a NoC traffic scenario simulation, such as one run by NoC design software. The activity data indicates activity per-unit. A floorplan estimation of the chip, based on a user-drawn outline of keep-in and keep-out regions, is shown with per-unit activity overlaid. The location of units is determined based on a placement estimation function. Some such algorithms are described in US patent publication US20130174113 A1. Other placement estimation algorithms are based on grid points.

According to some aspects and some embodiments, the activity of a unit is the sum of the number of transfers on each of its connections. According to some aspects and some embodiments, the activity per unit is weighted by the data width of connections between units. According to some aspects and embodiments, the activity per unit is weighted by an estimation of the size and type of logic in each unit. According to some aspects and some embodiments, the activity of a unit is weighted by its distance to other connected units. According to some aspects and some embodiments, the activity per unit is weighted by one or more clock frequencies of the unit. According to some aspects and some embodiments the activity per unit is weighted by a portion of time spent in a power-down state.

A weighting calculation includes a multiplication by a factor and addition of a constant. Since activity can be used as a proxy for power consumption, the constant accounts for leakage power consumption, as well as other factors not related to activity. The factor accounts for activity-proportional relative differences between units. In some aspects and embodiments, and for a sufficient level of accuracy in many cases, the factor provides a linear relationship to the weighting value. However, in some aspects and embodiments, to achieve more accuracy, a quadratic factor is used. In accordance with some other aspects and embodiments of the invention, an exponential factor is used.

According to some aspects and some embodiments, activity is calculated by running simulations of multiple scenarios, such as ones corresponding to different use cases of the chip.

According to some aspects and some embodiments, multiple unit lists are analyzed. Different unit lists correspond to, for example, different experiments in architectural tradeoffs that instantiate different numbers or different kinds of units.

According to some aspects and some embodiments, activity distribution is calculated for multiple outlines. Different outlines can correspond to different potential floorplans. Typically some floorplans lend themselves to better activity distribution than others, and some floorplans lend themselves better to other factors related to usability and manufacturability.

According to some aspects and some embodiments, calculation of activity distribution is performed without simulation. A description of stimulus, description of connectivity between units, and unit placement within a floorplan are sufficient for an activity estimate to the extent that activity halts in a unit when it must wait for a resource. For example, since there is essentially no activity on a NoC link while it is blocked by downstream traffic, it is only necessary to know the total amount of bandwidth sent on initiator-target routes through the link in order to compute average activity. Units with constant types of activity, such as clocks or free-running counters, are accounted for with constant activity values.

The clock tree in many designs and use cases has more switching activity than the logic that it drives. Clock gating can reduce such activity. Clock gating can be done at different levels based on different state information, such as at a module level based on a handshake signal or at a gate level based on a synthesis-tool-generated latch. According to some aspects and some embodiments, activity estimation includes a weighting factor based on the levels of clock gating that are employed.

According to some aspects and some embodiments, a density map is calculated. This represents the activity per unit area in each region. It is calculated at multiple region granularities, including at the individual grid sector level and the unit level.

According to some aspects and some embodiments a threshold is defined. A region in which activity density exceeds the threshold is considered to be a failure.

Visualization

Referring now to FIG. 1, in accordance with some aspects and some embodiments of the invention, a scenario description 112 is shown that run on the system described by netlist of units 114 in simulation 122 to produce a description of per-unit activity and data transfer activity between units. Floorplan outline 116 is used to constrain the locations of units described by netlist of units 114. Those are processed by unit location estimation function 124 to produce per-unit location description 134. Per-unit activity information 132 is reconciled with per-unit location information 134 in function 142, which calculates the activity per range of locations to produce per-range activity description 152. That information is used by display function 162 to graphically display for a user the amount of average and maximum instantaneous activity per unit and the amount of data transfer activity between units.

According to some aspects and some embodiments of the invention, the floorplan is represented as a two-dimensional grid of points with rectilinear regions carved out for macros. Macros are units, such as static random access memory (SRAM) cells, that create wire routing obstructions. The basic floorplan is overlaid with a color layer showing a color for each grid point. Each color indicates a level of activity. Typically bright red hued colors indicate high levels of activity, yellow and green for middle levels and dark blue or black for little or no activity. Typically the grid will have hundreds or thousands of points in each dimension in order to provide sufficiently high resolution for a designer to discern interesting parts of the chip. The color of each point is determined by which unit is estimated to be placed at the point, and the activity level of the unit.

Figure 2:
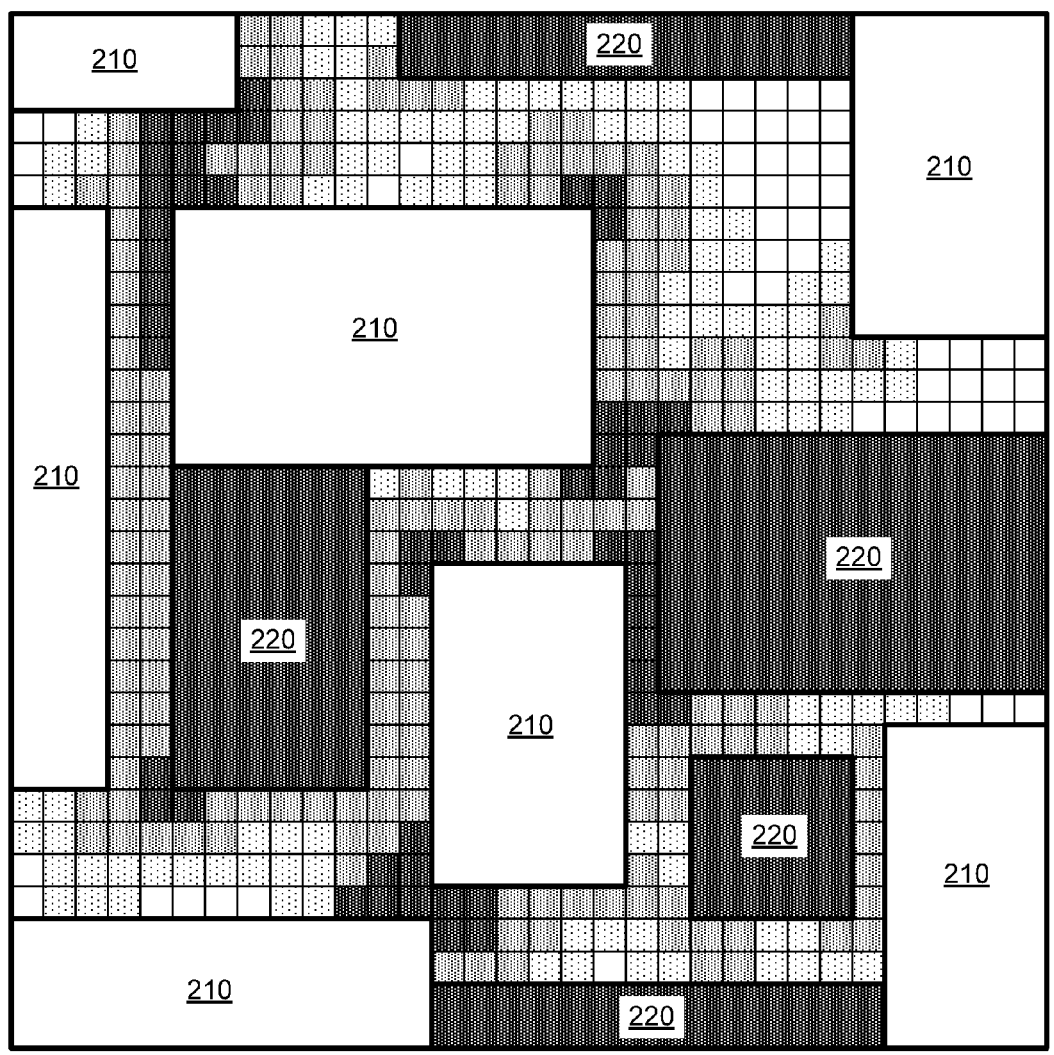
FIG. 2 illustrates a 2D display of a floorplan activity map in accordance with the various aspects of the invention.

Referring now to FIG. 2, according to some aspects and some embodiments, the macro regions of the floorplan are identified as to their activity level. FIG. 2 shows a floorplan grid with a color overlay with different colors, each color indicated by patterns. For clarity, the floorplan in the drawing has fewer than 50 points in each dimension. Macro regions 210 have low activity and are shaded as such. Macro regions 220 have high activity and are shaded as such. Points of color 230 are bright red. Points of color 232 are yellow. Points of color 234 are green. Points of color 236 are dark blue.

According to some aspects and some embodiments, connections between units are shown by lines. The lines have arrow heads indicating direction of data flow. The thickness of each line indicates the data width of the connection. The level of activity of data transfer at the connection between units is indicated by the color of each line.

Figure 3:
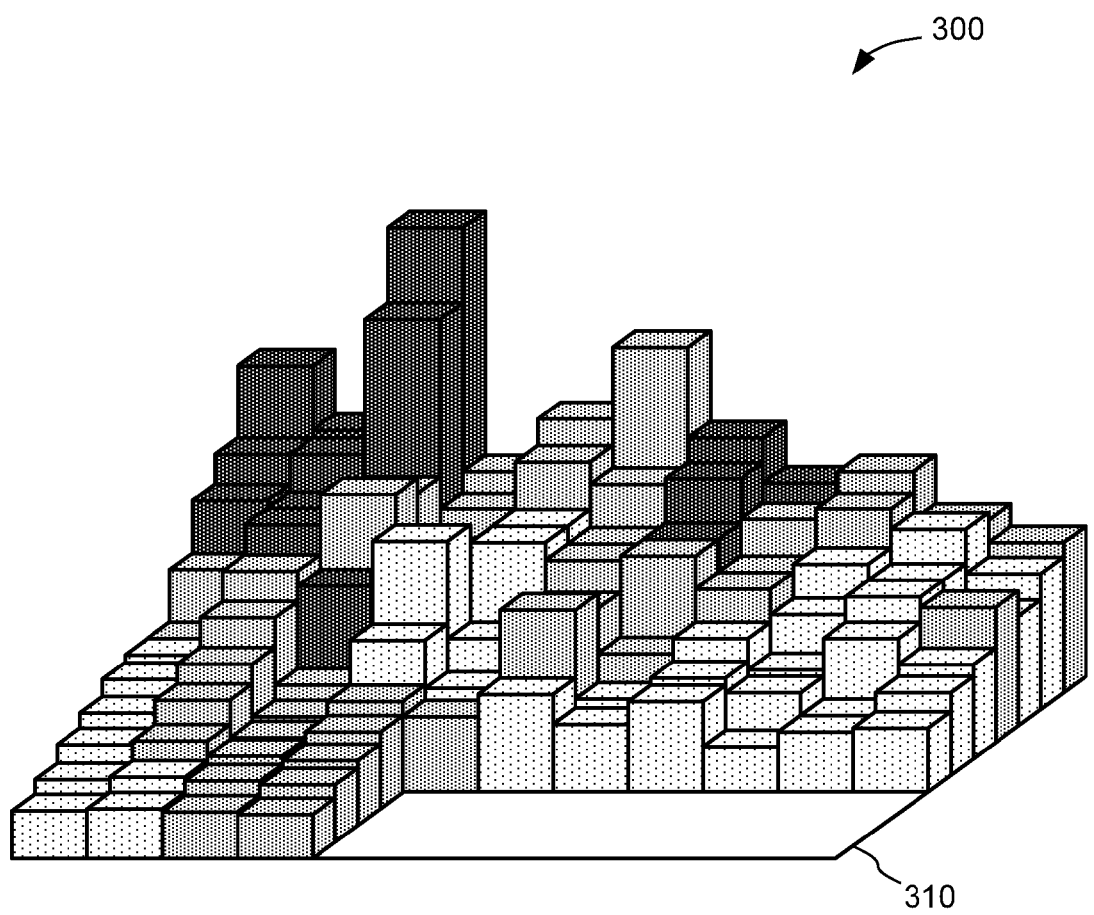
FIG. 3 illustrates a 3D display of a floorplan activity map indicating average activity and maximum instantaneous activity in accordance with the various aspects of the invention.

Referring now to FIG. 3, according to some aspects and some embodiments, the power distribution within a floorplan 300 is shown as a three dimensional grid of colored blocks. A block corresponds to each point. The height of the block indicates the max instantaneous activity and the color of the block indicates the average activity over a period of time. FIG. 3 shows a segment of the floorplan 300 represented as a grid of blocks. Different colors are identified in the figure by different patterns. For clarity, the floorplan 300 has fewer than 20 points in each dimension. Floorplan 300 includes region 310, which is a macro region, such as one for an SRAM with negligible activity.

According to some aspects and some embodiments, the duration of an instant for purposes of determining peak instantaneous activity is selected by the user. Typically it corresponds to the amount of time for settling of transient spikes within a power net, which is typically in the range of 1 to 100 nanoseconds.

According to some aspects and some embodiments one or more scenarios are included in the displayed results. Scenarios to be considered in the activity calculations to display are selected by clicking check-boxes on a list of scenarios.

According to some aspects and some embodiments, the display is updated for a range of simulation time. The simulation times to be included in the display are selected either by entering a start and end simulation time or else by sliding a beginning and ending time slider in a GUI view.

According to some aspects and some embodiments, regions in which activity density fails a threshold test are shown in a unique way. One way is with a bright purple color. Another way is with a blinking color. Another way is with a texture.

Optimization

Given the information, from estimation of activity per floorplan location, it is possible to optimize the chip design.

One way to optimize is to optimize the floorplan. According to some aspects and some embodiments, the optimization process is performed by the user, by iteratively changing the floorplan and rerunning estimation. According to some aspects of the invention, optimization is performed automatically by solving a cost function to which the activity per range of locations is an input. Some possible other inputs to consider, according to other aspects of the invention, in the cost function would be wire density, as a measure of routing congestion, and logic density, as a measure of total required die area.

Generally, however, the goal of optimization is one or both of: minimizing the worst-case max instantaneous activity, which is representative of spikes on the power nets of the chip; and minimizing worst case average activity, which is representative of heat dissipation requirements. An optimized floorplan, compared to a less-than-optimal floorplan, will have macro dimensions arranged so that intermediate logic of high activity is squeezed into regions of the chip that would otherwise have low activity.

According to some aspects and some embodiments, the optimization process provides a floorplan definition file, such as a design exchange format (DEF) file. According to some aspects and some embodiments, the optimization process provides an output file with constraints or guidance to a place and route tool for the back-end of the chip design process. This can be in a tool control language (TCL) or synthesis design constraints (SDC) file.

Another way to optimize is to optimize the units that are placed within the floorplan. In some aspects and some embodiments, this includes refactoring logic, such as to duplicate logic functions, so that each copy carries less activity and both can be separated within the floorplan to spread out the activity. In some aspects and some embodiments this includes configuring a network-on-chip topology. Optimizing the topology of a network-on-chip can involve:
  determining the number, ordering, and location of switches;
  the assignment of NoC units to different power domains;
  the assignment of NoC units to different clock domain;
  the assignment of NoC units to different logic module hierarchy;
  the inclusion and configuration of quality-of-service (QoS) bandwidth regulators;
  the assignment of priorities and bandwidth allocation to virtual channels;
  the instantiation and configuration of traffic shaping logic; and
  other design configuration options.

Topology optimization should consider both physical activity density and QoS (bandwidth and latency) requirements of initiator and target IPs on a chip.

According to some embodiments, if any region fails a threshold test then another iteration of optimization is run. If a certain number of iterations is reached then the floorplan and netlist combination are determined to be incompatible.

As will be apparent to those of skill in the art upon reading this disclosure, each of the aspects described and illustrated herein has discrete components and features, which may be readily separated from or combined with the features and aspects to form embodiments, without departing from the scope or spirit of the invention. Any recited method can be carried out in the order of events recited or in any other order which is logically possible.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Unless defined otherwise, all technical and scientific terms used herein have the same meaning as commonly understood by one of ordinary skill in the art to which this invention belongs. Any methods and materials similar or equivalent to those described herein can also be used in the practice of the invention. Representative illustrative methods and materials are also described.

Therefore, the scope of the invention, therefore, is not intended to be limited to the various aspects and embodiments discussed and described herein. Rather, the scope and spirit of invention is embodied by the appended claims.

What is claimed is:

1. A method comprising:
   estimating activity distribution within a floorplan, wherein the activity includes the amount of data transfer that results in power consumption;
   providing a visual representation of the activity distribution on a display of a system that includes a user interface unit;
   accepting, as input through the user interface unit of a computer device, information descriptive of a location of each of a multiplicity of units;
   accepting, as input through the user interface unit, information descriptive of an amount of data transfer between each of the multiplicity of units;
   calculating, for a range of locations, an amount of data transfer as a function of the location of at least one unit of the multiplicity of units resulting in power consumption of the at least one unit of the multiplicity of units to determine high activity regions; and
   optimizing the floorplan by selecting placement of the multiplicity of units based on the amount of the activity to avoid high activity regions and reduce power consumption and show a visual representation of power distribution in the floorplan.

2. The method of claim 1 further comprising:
   displaying, on the display of the system, a representation of the floorplan; and
   displaying, on the display of the system and within the floorplan, the at least one unit of the multiplicity of units,
   wherein displaying of the at least one unit of the multiplicity of units represents the amount of the activity.

3. The method of claim 1 further comprising:
   displaying, on the display of the system, the floorplan; and
   displaying, on the display of the system and within the floorplan, a connection between at least two units of the multiplicity of units,
   wherein the displaying of the connection represents the amount of the activity.

4. The method of claim 1 further comprising running a function, using the system, to estimate locations of the multiplicity of units to derive the information descriptive of the location of each of the multiplicity of units of the NoC.

5. The method of claim 1 further comprising running a function, using the system, to derive the information descriptive of the amount of the activity of each of the multiplicity of units.

6. The method of claim 5 wherein the function is a simulation of traffic within the NoC.

7. The method of claim 1 further comprising changing the location of the at least one unit of the multiplicity of units such that the location is in a region of the floorplan with lower activity density than the location described by the input information.

8. A method of placement of a multiplicity of units within a floorplan wherein the placement uses information descriptive of the activity of the multiplicity of units, wherein the activity includes amount of data transfer resulting in power consumption, the method comprising:
   accepting, as input through a user interface unit, information descriptive of a location of each of a multiplicity of units;
   accepting, as input through the user interface unit of a computer device, information descriptive of an amount of data transfer between each of the multiplicity of units;
   calculating an amount of data transfer as a function of the location of at least one unit of the multiplicity of units to determine power consumption of the at least one unit of the multiplicity of units at the location in order to determine if high activity is created by placement of the at least one unit of the multiplicity of unit at the location; and
   optimizing the floorplan by selecting a new location for the at least one unit of the multiplicity of units to minimize the amount of the activity in order to reduce power consumption and minimize high activity and show a visual representation of power distribution in the floorplan.

9. At least one non-transient computer readable medium storing executable code, which when executed, causes a computing device to:
  accept, as input through a user interface unit of a computer device, information descriptive of a location of each of a multiplicity of units;
  estimate activity for the multiplicity of units based on the location of each of a multiplicity of units within a floorplan, wherein the activity includes an amount of data transfer resulting in power consumption;
  calculate an amount of data transfer as a function of the location of at least one unit of the multiplicity of units to determine power consumption of the at least one unit of the multiplicity of units at the location;
  determine if high activity is created by placement of the at least one unit of the multiplicity of unit at the location; and
  optimizing the floorplan by selecting a new location for the at least one unit of the multiplicity of units to minimized the amount of the activity and reduce power consumption in order to minimize high activity and show a visual representation of power distribution in the floorplan.

\* \* \* \* \*